United States Patent [19]

Aoki et al.

[11] Patent Number: 5,236,182
[45] Date of Patent: Aug. 17, 1993

[54] SUSPENSION DEVICE FOR USE WITH AUTOMOTIVE POWER UNIT

[75] Inventors: Hirofumi Aoki, Chigasaki; Yoshiharu Nakaji, Yokosuka; Kazuhiro Doi, Fujisawa; Shigeki Sato, Yokosuka, all of Japan

[73] Assignee: Nissan Motor Co., Inc., Yokohama, Japan

[21] Appl. No.: 798,080

[22] Filed: Nov. 27, 1991

[30] Foreign Application Priority Data

Nov. 28, 1990 [JP] Japan .................................. 2-326391

[51] Int. Cl.$^5$ .............................................. B60K 5/12
[52] U.S. Cl. ........................... 267/140.14; 267/140.12
[58] Field of Search ............. 267/140.1 AE, 140.1 E, 267/140.1 C, 219, 35; 248/562, 550, 636, 638; 262/140.11, 140.12, 140.13, 140.14

[56] References Cited

U.S. PATENT DOCUMENTS

| | | | |
|---|---|---|---|
| 3,599,428 | 8/1971 | Chaney et al. | 60/52 R |
| 4,671,227 | 6/1987 | Hollerweger et al. | 123/192 R |
| 4,720,087 | 1/1988 | Duclos et al. | 267/140.1 |
| 4,733,758 | 3/1988 | Duclos et al. | 267/140.1 AF |
| 4,742,998 | 5/1988 | Schubert | 267/136 |
| 4,757,981 | 7/1988 | Haertel | 267/140.1 |
| 4,759,534 | 7/1988 | Haertel | 267/140.1 |
| 4,773,632 | 9/1988 | Haertel | 267/140.1 |
| 4,893,800 | 1/1990 | Tabata | 267/140.1 |
| 4,909,489 | 3/1990 | Doi | 267/140.1 |
| 4,913,409 | 4/1990 | Doi et al. | 267/140.1 |
| 4,919,402 | 4/1990 | Doi | 267/140.1 |
| 4,928,935 | 5/1990 | Matsui | 267/140.1 |
| 4,971,299 | 11/1990 | Doi | 267/140.1 |
| 5,028,039 | 7/1991 | Sato | 267/140.1 |
| 5,029,825 | 7/1991 | Doi | 267/140.1 |
| 5,037,071 | 8/1991 | Takano et al. | 267/140.1 AE |
| 5,052,662 | 10/1991 | Doi | 267/140.1 |
| 5,060,919 | 10/1991 | Takano et al. | 267/140.1 AE |
| 5,065,869 | 11/1991 | Doi et al. | 207/140.1 |

FOREIGN PATENT DOCUMENTS

60-104828 6/1985 Japan .
61-74930 4/1986 Japan .

*Primary Examiner*—Matthew C. Graham
*Attorney, Agent, or Firm*—Foley & Lardner

[57] ABSTRACT

In order to attenuate vibration which tends to be transmitted from a power unit to a vehicle passenger during the idling mode of engine operation, ERF filled engine mounts are arranged so that when neither of two orifice passages are restricted by impressing a voltage on ERF viscosity control electrodes included therein, the frequency at which the dynamic spring constant exhibits a minimum value is the same as the frequency at which the vibration transmission phase maximizes while one of the two orifice passages is restricted by the application of a voltage on the set of electrodes disposed therein. Rapid cyclic control of the dynamic spring constant and the vibration transmission phase for each mount used to support a power unit is carried out. This enables a desirable compromise in the control of the two different parameters.

4 Claims, 7 Drawing Sheets

SUSPENSION DEVICE FOR USE WITH AUTOMOTIVE POWER UNIT

BACKGROUND OF THE INVENTION

1. Field of the Invention

The present invention relates generally to a suspension device which can be used to support vibrating bodies on a base and more specifically to such a suspension device which can be used to attenuate the transmission of vibration between an automotive power unit and a vehicle chassis, particularly during idling modes of power unit operation.

2. Description of the Prior Art

JP-A-60-104828 discloses a previously proposed suspension device which is designed to support a power unit (engine/transmission unit) on a vehicle chassis. This device includes an elastomeric body in which main and auxiliary working chambers are defined. The chambers are connected by an orifice passage structure in which electrodes are disposed. The chambers and the passage structure are filled with an ERF (electrorheological fluid) which undergoes an increase in viscosity when exposed to a high voltage. When the elastomeric body is distorted by the movement of the power unit, the volume of the main working chamber changes, which tends to pump ERF back and forth to the auxiliary chamber.

By impressing a high voltage on the electrodes in response to the engine rotational speed (by way of example), it is possible to control the viscosity of the slug of ERF in the orifice passage structure and thus control the dynamic spring constant and the vibration transmission phase in a manner which enables vibration damping in a number of different frequency ranges.

However, this relatively straightforward approach to the problem of controlling vibration has room for improvement.

SUMMARY OF THE INVENTION

During the development of the present invention, it was proposed to determine the amount of vibration which was being transmitted to the vehicle occupants by monitoring the vehicle cabin floor vibration at a selected point or points and developing a vectorial analysis of the vibration (Japanese Patent Application No. 2-8778).

More specifically, this arrangement was such as to determine the magnitude and phase of the vibrational input at a plurality of support points and to analyze the vectors produced at each of the points. Even though the inputs are relatively large, it is possible to attenuate the vectorial sums in a manner which results in the amount of vibration which reaches the vehicle passenger(s) being reduced.

It was learned that by using the above mentioned vectorial approach and, given that it was possible to change the dynamic spring constant and the vibrational phase over a wide range and thus relatively freely adjust the vector attenuation, it would be possible to enable effective vibrational damping characteristics.

However, with this technique, during the periods the voltage is and is not applied to the ERF viscosity control electrodes, the frequency at which the dynamic spring constant maximizes and the frequency at which the maximum phase changes occur at different fixed values. As a result, the engine vibration which is responsible for the floor vibration, is particularly for the purposes of reducing vibration during the idling mode of engine operation, such that, if the frequency at which maximum change in dynamic spring constant occurs is adjusted to occur at the idling frequency, the change in phase is undesirably reduced, while if, on the other hand, the frequency at which the maximum change in phase occurs is adjusted to occur at the idling frequency, the maximum change in dynamic spring constant undergoes an undesirable reduction.

Accordingly, in either case it is impossible to achieve a large reduction in the vectors and, therefore, very difficult to achieve the desired large overall attenuation of floor vibration.

Accordingly, it is an object of the present invention to provide a control arrangement for a power unit suspension device of the above described nature, which is able to achieve a large change in both the dynamic spring constant and the phase in which the vibration is transmitted, and thus enable a large overall reduction in the floor vibration.

In brief, the above object is achieved by an arrangement wherein ERF filled engine mounts are constructed so that when neither of two orifice passages are restricted by impressing a voltage on ERF viscosity control electrodes included therein, the frequency at which the dynamic spring constant exhibits a minimum value is the same as the frequency at which the vibration transmission phase maximizes while one of the two orifice passages is restricted by the application of a voltage on the set of electrodes disposed therein. Rapid cyclic control of the dynamic spring constant and the vibration transmission phase for each mount used to support a power unit is carried out and enables a desirable compromise in the control of the two different parameters.

More specifically, a first aspect of the present invention includes a mount for supporting a power unit on a vehicle chassis which features an elastomeric body in which main and auxiliary chambers are defined; and first and second orifice passages for providing fluid communication between the main and auxiliary chambers, said first and second orifice passages respectively including first and second sets of electrodes upon which voltages can be selectively impressed by first and second individually controllable voltage sources, the first and second orifice passages, main and auxiliary chambers being filled with an electrorheological fluid which exhibits an increase in viscosity when exposed to a high voltage, said first and second orifice passages being arranged to cooperate with the main chamber in a manner wherein when neither of the first and second sets of electrodes have a voltage impressed thereon, the frequency at which the mount exhibits a minimum dynamic spring constant is the same as the frequency at which the mount exhibits a maximum vibration transmission phase when the impression of a voltage on one of the first and second sets of electrodes is absent.

a second aspect of the present invention includes a vehicle which includes a power unit having an internal combustion engine; a parameter sensor which senses a parameter which varies with the rotational speed of the engine; a mount which supports said power unit on a chassis of the vehicle, the mount including main and auxiliary electrorheological fluid filled chambers which are interconnected by first and second orifice passages, the first and second passages respectively including first and second sets of electrodes which are connected to first and second independently controllable sources of voltage; a vibration sensor disposed on the vehicle chassis; control means operatively connected with said parameter sensor, said vibration sensor and said first and second sources of voltage, said control means including circuitry for: controlling the dynamic spring constant of the mount by: selecting a first voltage based on the output of the parameter sensor: inducing the first and second sources of voltage to apply the first voltage to said first and second sets of electrodes: incrementing the first voltage in response to vibration which is sensed by the vibration sensor as decreasing: and decrementing the first voltage in response to the vibration which is sensed by the vibration as increasing by a first predetermined amount; and alternately controlling the vibration transmission phase by: selecting a second voltage based on the output of said parameter sensor; inducing the first voltage source to impress a maximum voltage on the first set of electrodes; inducing the second voltage source to impress the second voltage on the second set of electrodes; incrementing the second voltage in response to the vibration which is sensed by said vibration sensor as decreasing; and decrementing the second voltage in response to the vibration which is sensed by said vibration sensor as increasing by a second predetermined amount.

A third aspect of the present invention includes a suspension arrangement for a power unit including a plurality of mounts which support said power unit on a chassis of a vehicle, each mount including main and auxiliary chambers which are interconnected by first and second orifice passages, the first and second passages respectively including first and second sets of electrodes which are connected to first and second independently controllable sources of voltage, each mount being so constructed and arranged that said first and second orifice passages cooperate with the main chamber so that when neither of the first and second sets of electrodes have a voltage impressed thereon, the frequency at which the mount exhibits a minimum dynamic spring constant is the same as the frequency at which the mount exhibits a maximum vibration transmission phase when the impression of a voltage on one of the first and second sets of electrodes is absent; a vibration sensor disposed on the vehicle chassis proximate a passenger compartment; control means operatively connected with said vibration sensor and said first and second sources of voltage, said control means including circuitry for determining that the engine is idling and for cyclically controlling the dynamic spring constant and the vibration transmission phase of each of the mounts while the engine is idling: the dynamic spring constant of each of the mounts being controlled by: inducing the first and second sources of voltage to impress a first voltage on said first and second sets of electrodes; incrementing the first voltage in response to vibration which is sensed by the vibration sensor as decreasing; and decrementing the first voltage in response to the vibration which is sensed by the vibration sensor as increasing by a first predetermined amount; and the vibration transmission phase of each of the mounts being controlled by: inducing the first voltage source to impress a maximum voltage on the first set of electrodes; inducing the second voltage source to impress a second voltage on the second set of electrodes, incrementing the second voltage in response to the vibration which is sensed by said vibration sensor as decreasing; and decrementing the second voltage in response to the vibration which is sensed by said vibration sensor as increasing by a second predetermined amount.

DETAILED DESCRIPTION OF THE PREFERRED EMBODIMENTS

Figure 1:
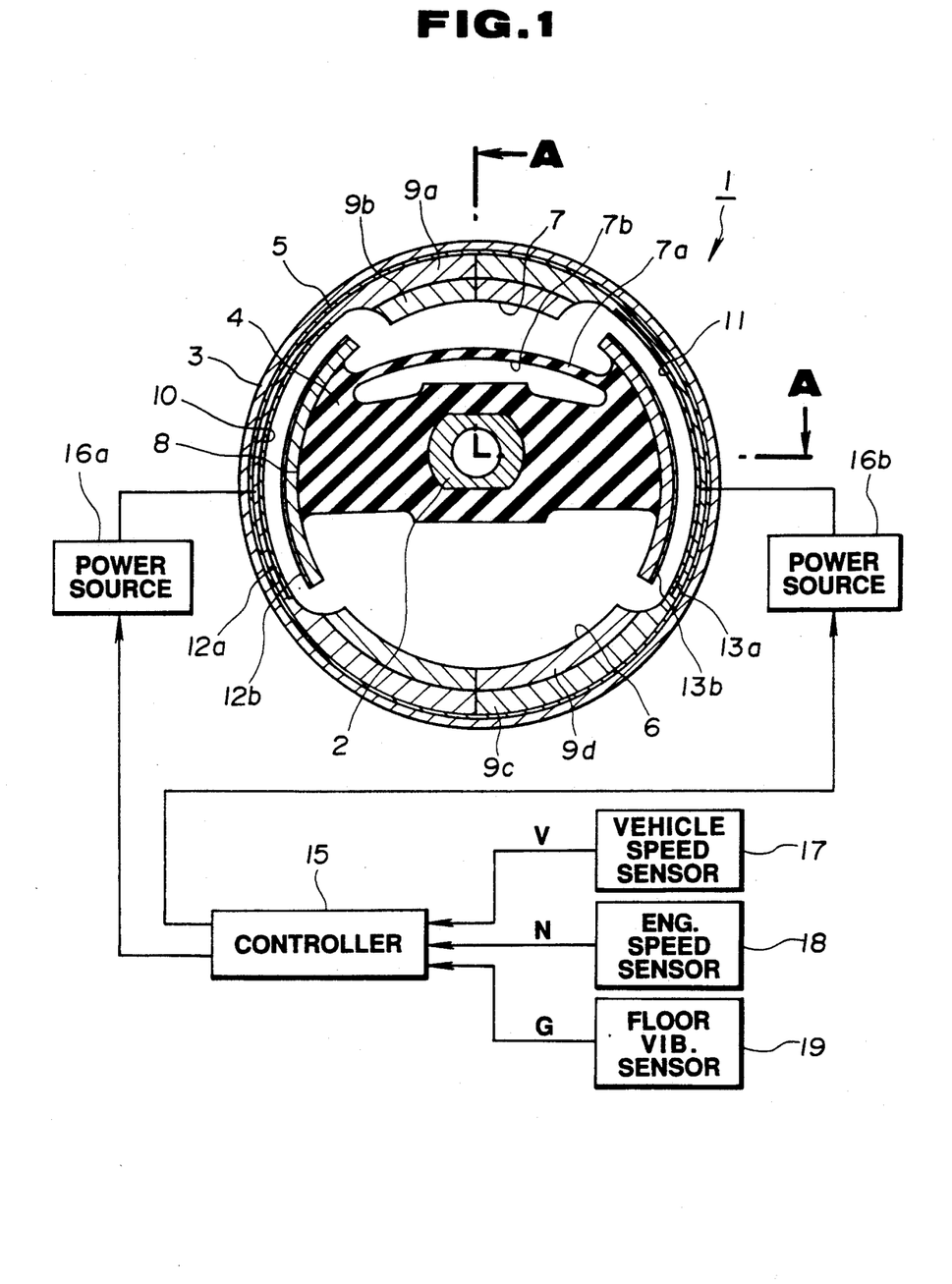
FIG. 1 is a front sectional elevation of a power unit suspension device to which the present invention is applied.
Figure 2:
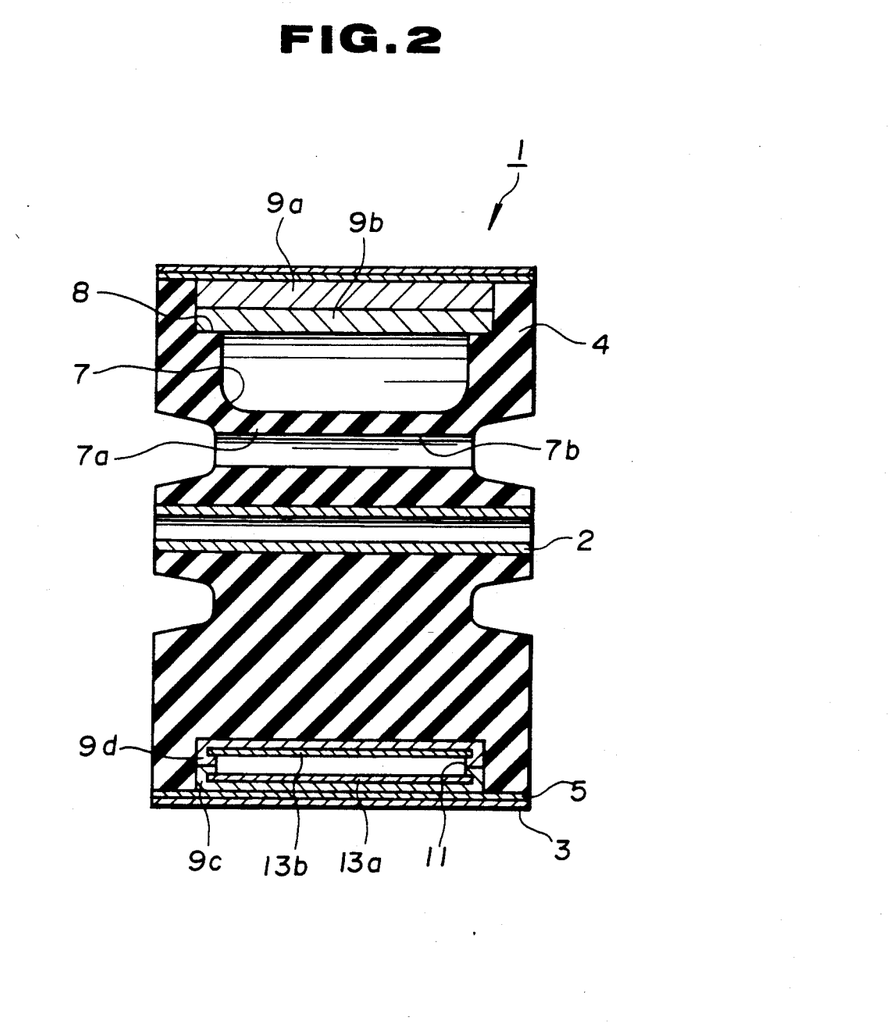
FIG. 2 is a side section of the mount shown in FIG. 1 as taken along section line A—A.
Figure 3:
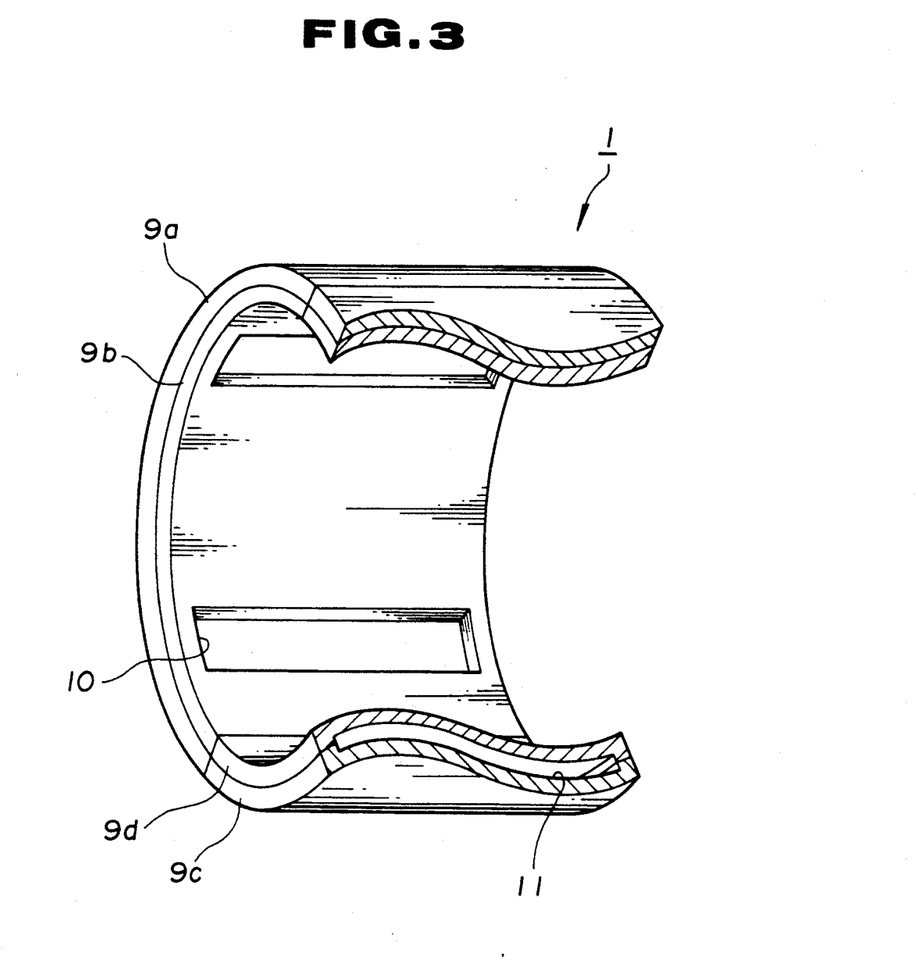
FIG. 3 is a perspective view showing constructional aspects of the device shown in FIGS. 1 and 2.

FIGS. 1 to 3 show constructional features of a suspension device to which the present invention is applied. As shown, this arrangement basically comprises a inner tubular member 2, an outer tubular member 3 and an elastomeric body 4 which is disposed between the same. The inner periphery of the elastomeric body 4 is permanently fixed to the outer periphery of the inner tubular member 2. The outer tubular member 3 has a elastomeric layer 5 permanently fixed to its inner periphery and is force fitted into the illustrated position about the outer periphery of the elastomeric body 4.

Suitably shaped cavities define main, auxiliary and air chambers 6, 7, 7b in the elastomeric body. A flexible diaphragm hermetically separates the auxiliary and air chambers 7, 7b. The air chamber is arranged to have both ends open to the ambient atmosphere as shown in FIG. 2.

The elastomeric body 4 is formed with an annular channel-shaped recess 8 about its mid-outer peripheral portion. Four orifice passage structure defining members 9a, 9b, 9c and 9d are disposed in this recess 8. These four members are arranged in the manner shown in FIG. 3 to define two orifice passages 10 and 11 which both fluidly interconnect the main and auxiliary chambers 6, 7 in the manner illustrated in FIG. 1.

Strip shaped electrodes 12a, 12b and 13a, 13b are disposed on the outer and inner peripheral wall portions of the orifice passages 10 and 11, respectively.

A controller 15 is respectively connected to the two sets of electrodes 12a, 12b and 13a, 13b by way of power (voltage) sources 16a and 16b.

In this instance the controller includes a microprocessor or microcomputer which includes memory sections (e.g. RAM and ROM) and is arranged to receive data inputs V, N and G from a vehicle speed sensor 17, an engine speed sensor 18 and a floor vibration sensor 19. In accordance with the inputted data, the microprocessor processes the same and issues commands via which the impression of voltages across the electrodes in selectively induced.

Figure 4:
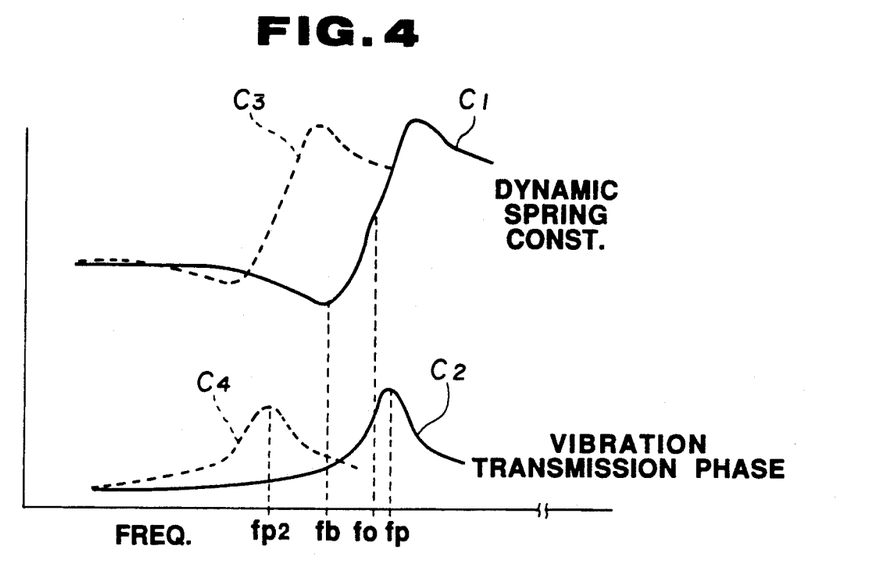
FIG. 4 is a graph which shows the changes in dynamic spring constant and phase characteristics which are induced by increasing the viscosity of the ERF in the orifice passage structure and effectively closing off the same.

When it is not necessary to impress voltages on any of the electrodes 12a, 12b and 13a, 13b, the power unit assumes a normal condition wherein the dynamic spring constant and vibration transmission phase respectively exhibit the characteristics depicted in solid lines C1 and C2 in FIG. 4.

Under these conditions, the dynamic spring constant and vibration transmission ratio exhibit minimum values at a frequency fb which is 5~10 Hz lower than the resonance frequency fo of the system which is given by the following equation:

$$fo = \frac{1}{2\pi}\left(\frac{k(S1/S2)^2}{l \cdot S1 \cdot \rho}\right)^{\frac{1}{2}} \quad (1)$$

wherein:
S1: is the total cross-sectional area of the orifice passages 10 and 11
S2: is the cross-sectional area of the main chamber 6
k: is the spring constant of the elastomeric body 4
l: is the flow length of the orifice passages 10 and 11; and
ρ: is the density of the ERF On the other hand, when the vibration transmission phase maximizes, the maximum frequency fp of the power unit vibration which can be limited is such as to be higher than the resonance frequency fo (which is in turn higher than fb).

Accordingly, it is impossible under these conditions to tune the device so that the frequency fb at which the dynamic spring constant minimizes and the frequency fp at which the vibration transmission phase maximizes, are simultaneously the same.

The broken line traces C3, C4 depict the dynamic spring constant and vibration transmission phase characteristics which are obtained when the total cross-sectional area S1 of the orifice passages which interconnect the main and auxiliary chambers 6, 7, is set at half the above value ($\frac{1}{2}$). Under these conditions, the vibration transmission phase maximizes at fp2. The relationship which exists between fp2 and the above mentioned frequency fp is given by the following equation:

$$fp2 = fp/2^{\frac{1}{2}} \quad (2)$$

Thus, as will be appreciated, if the cross-sectional areas of the orifice passages 10 and 11 are appropriately set, the frequency fb at which the dynamic spring constant minimizes under conditions wherein neither of the electrode sets (12a, 12b and 13a, 13b) have a voltage impressed thereon, and the frequency fp3 at which vibration transmission phase maximizes under conditions wherein a voltage is impressed on only one of the electrodes sets in the orifice passages 10 and 11, can be made the same.

Figure 5:
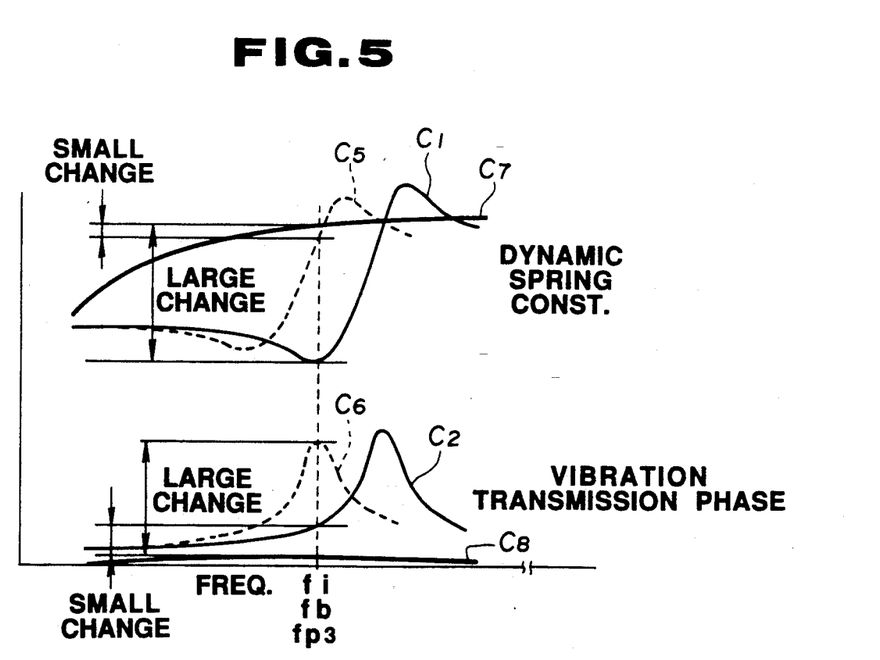
FIG. 5 is a graph showing the characteristics which are provided by the embodiment of the present invention.

It will be noted that in FIG. 5 the broken line trace C5 denotes the dynamic spring constant characteristics which are obtained under conditions wherein the electrodes in one of the two passages are left de-energized while the electrodes in the other passage have a maximum voltage impressed thereon. Trace C6 denotes the vibration transmission phase characteristics which are achieved under the same conditions.

Trace C7 denotes the dynamic spring constant characteristics which are produced when both sets (12a, 12b and 13a, 13b) of electrodes have a high voltage impressed thereon, while trace C8 denotes the vibration transmission phase characteristics which are produced under such conditions.

With the instant embodiment, among the vibrations which are produced by the engine and which cause floor vibration, particularly while the engine is idling, it is possible to arrange for the frequency fb at which the minimum spring constant occurs (see trace C1), and the frequency fp3 at which the vibration transmission phase maximizes (see trace C6) to coincide with the engine idling frequency.

Therefore, while the engine is idling, it is possible to continuously achieve a large change in the dynamic spring constant between the characteristics denoted by traces C1 and C7 and to simultaneously achieve a large change in the vibration transmission phase between the characteristics denoted by traces C6 and C8.

It should be noted that in the case wherein a large change in dynamic spring constant occurs the change in vibration transmission phase between the C2 and C8 characteristics is small and vice versa.

That is to say, maximum attenuation of the vibrational vectors from the various points that the engine is suspended is possible in the instant embodiment because both the dynamic spring constant and the vibration transmission phase for the frequency of the vibration which is being transmitted can be changed over a wide range, therefore, the ease with which the vector attenuation is achieved, is increased.

Figure 6:
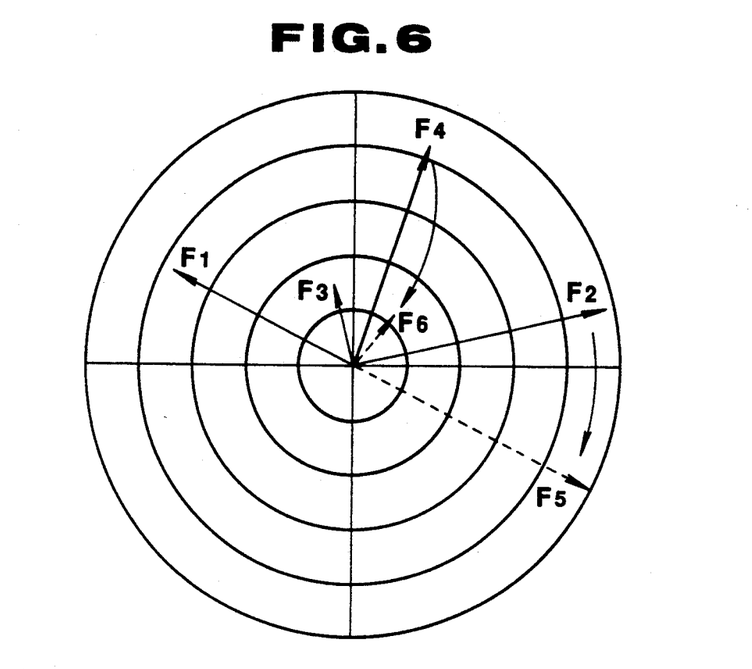
FIGS. 6 and 7 are graphs which show the effect provided by changes in phase and dynamic spring constant, respectively.

FIG. 6 graphically shows an example of vectorial attenuation of the floor vibration achieved at a given inspection or monitoring point by varying the vibration transmission phase in a system wherein a power unit is supported by three of the suspension devices according to the present invention.

More specifically, assume that the power unit is supported on a chassis at the left, right and at the rear by the type of device illustrated in FIG. 1. Further assume that the vibrational vectors which originate from the above mentioned mounts (suspension devices) are F1, F2 and F3, respectively. Also let it be assumed that the resultant of these three vectors is represented by F4.

In this instance the three vectors F1, F2 and F3 are such that the included angle is less than 180° and as such F4 is relatively large, resulting in a relatively large floor vibration.

By increasing the vibration transmission phase of the left mount, vector F2 can be converted into vector F5. The result of this is that vectors F1, F3 and F5 cooperate to produce a resultant vector F6 which, as shown, is considerably smaller than F4, and leads to a reduction in the floor vibration.

Figure 7:
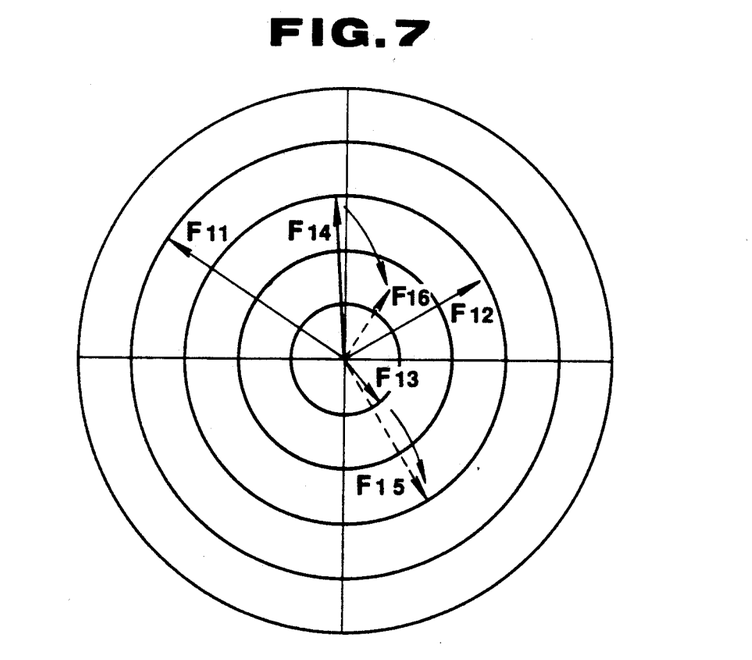

FIG. 7 graphically shows the above situation wherein the dynamic spring constant is considered.

Assume that F11, F12 and F13 are the vectors from the left, right and rear mounts and that the sum of the same results in a resultant F14. Under these conditions F14 is relatively large. However, by increasing the dynamic spring constant of the rear mount the F13 can be induced to change to F15 and induce the situation wherein the resultant F16 is smaller than F14 and the floor vibration is attenuated.

Figure 8:
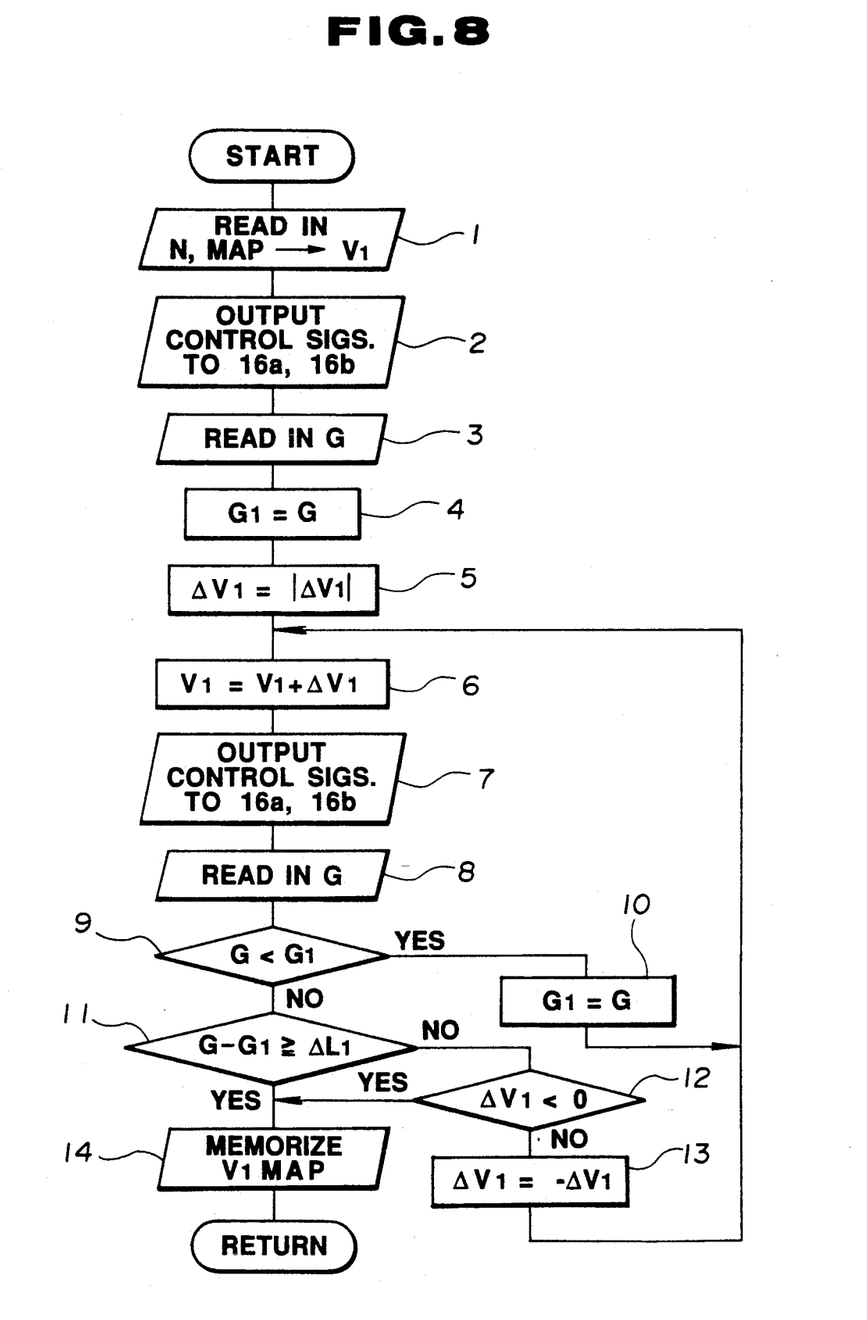
FIG. 8 is a flow chart which depicts the characteristic steps which are executed by a dynamic spring control routine which characterizes the present invention.
Figure 9:
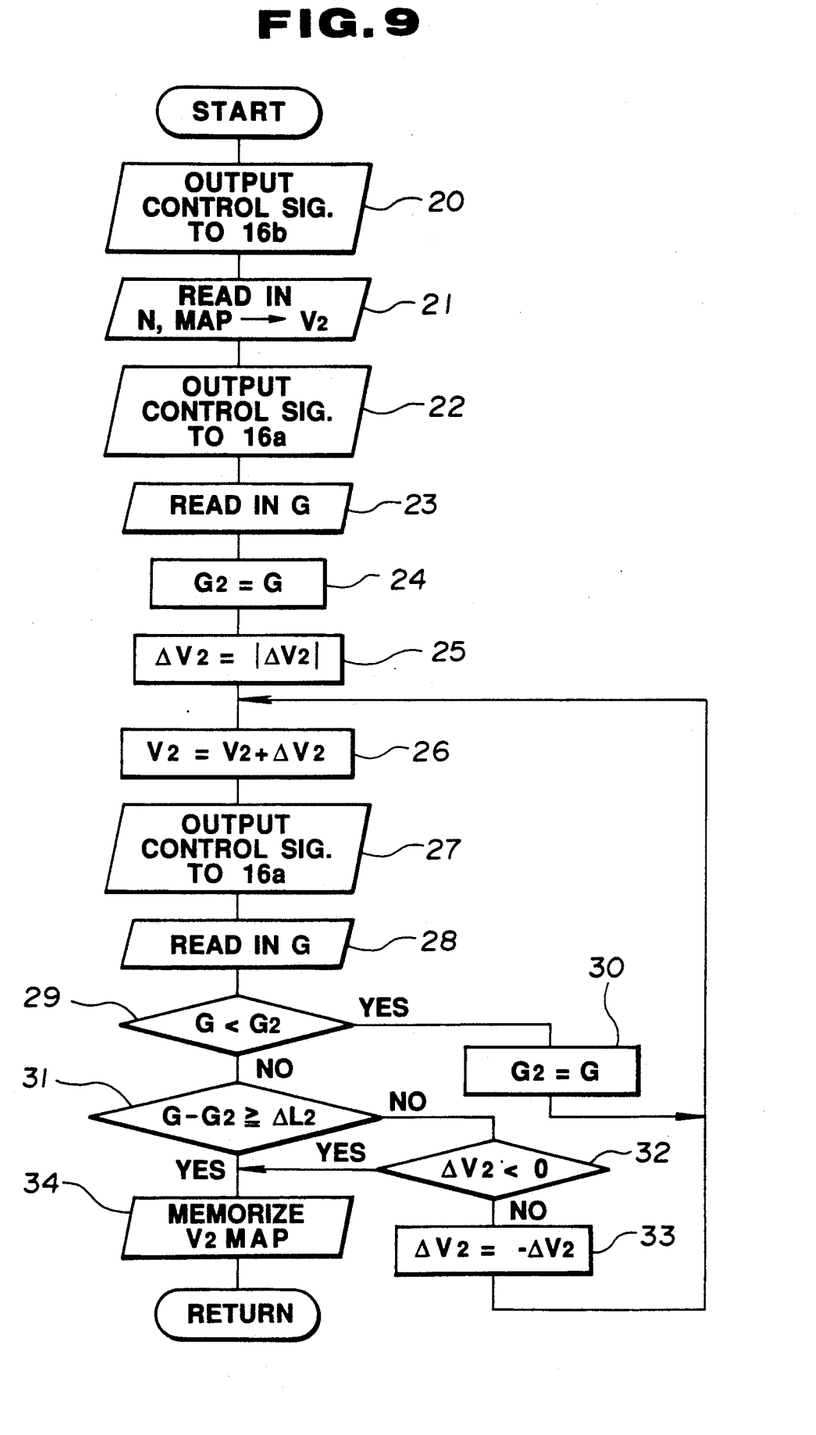
FIG. 9 is a flow chart which depicts the characteristic steps which are executed by a phase control routine which characterizes the present invention.

In order to achieve the above control, the microcomputer which is included in the controller 15 is provided with control routines of the nature depicted in flow chart form in FIGS. 8 and 9. However, before these routines are run, it is necessary to determine if the vehicle is moving or not and if the engine speed is such as to indicate that idling type vibrations will be produced. This is accomplished by reading the vehicle speed signal V which is supplied by the vehicle speed sensor 17 and determining if the vehicle is at a standstill or not. In addition to this, the engine speed signal N produced by the engine speed sensor 18 is read and the determination made if a vibration having an idling frequency fi is being produced or not.

Given that the required conditions are met, the routines are run.

It should be noted that while each of the electrically controllable mounts which are used to support the engine are sequentially controlled in the same manner, the following disclosure will be directed to the control of a single mount for the sake of simplicity and brevity.

It should also be noted that while the order in which the dynamic spring constant and the vibration transmission phase control are carried out is not important, the instant embodiment will be disclosed in a manner wherein the dynamic spring constant control is implemented before that of the phase control.

The first step of the routine shown in FIG. 8 is to read the instant engine speed and use this value to obtain a voltage value V1 via map look-up. This voltage value V1 is empirically derived and indicative of the most suitable voltage for use under the instant conditions. The value is updated based on the monitored operating conditions as will become apparent later.

Following this in step 2, based on the value of V1 just derived, commands are issued which induce the power sources 16a and 16b to suitably impress voltage V1 on the electrode sets (12a, 12b and 13a, 13b) in the orifice passages 10 and 11.

Next, at step 3 the acceleration G which is sensed by the floor vibration sensor 19 is read in and set as G1 in step 4.

In step 5, a predetermined voltage increment $\Delta V1$ is set and the absolute value thereof added to the V1 value in step 6. This gradually increases the voltage which is applied to the electrode sets and increases the viscosity of the ERF. As a result the dynamic spring constant characteristics approach those denoted by trace C7 in FIG. 5. Following this the output of the floor vibration sensor 19 is again read and the value set in memory as G. In step 9 the just determined G value is compared with the G1 value determined in step 4. In the event that G<G1, a reduction in floor vibration is indicated and the routine flows to step 10 wherein G1 is set equal to G and then loops back to step 6.

On the other hand, in the event that $G \geq G1$ which is indicative of the floor vibration having increased the routine goes to step 11 wherein it is determined if the difference between G and G1 is less than a predetermined amount (viz., $G-G1 < \Delta L1$). In the event of a negative outcome the routine goes to step 12 wherein it is determined if the instant value of $\Delta V1$ is less than zero or not. In the event that $\Delta V1$ is positive, the routine returns to step 6 after converting the $\Delta V1$ to a negative value.

As will be appreciated, after having passed through step 13 the value of $\Delta V1$ is rendered negative whereby upon the next pass of the routine through step 6 the value of V1 is decremented by $\Delta V1$. This induces the situation wherein in step 7 the voltages which are applied to the electrodes are reduced allowing the viscosity of the ERF to accordingly reduce. This induces the dynamic spring constant characteristics to shift back toward those depicted by the C1 trace.

On the other hand, if the outcome of step 11 is such as to indicate that $G - G1 \geq \Delta L1$, or in step 12 the value of $\Delta V1$ is found to be negative, the routine goes to step 14 wherein the value of V1 is written into the map used in step 1 and the dynamic spring constant control routine returns.

As will be appreciated with this type of control the dynamic spring constant can be controlled to a value which is between the characteristics denoted by traces C1 and C7 and thus variable over a relatively large range.

It will be noted that with the dynamic spring constant controlled in this manner, the vibration transmission phase undergoes a change between the characteristics denoted by traces C2 and C8. However, the range in which this change occurs is relatively small.

Following the completion of the routine shown in FIG. 8 the routine of FIG. 9 is run. This routine is basically similar to the previous one and the main difference comes in that at step 20 commands are issued to induce the power source 16b to impress a maximum voltage on the set of electrodes in the orifice passage 11. No control signals are issued to the power source 16a and the electrode set in orifice passage 10 is left de-energized. Following this at step 21 the engine speed N is read in and a map look-up carried out in order to obtain an initial voltage value V2 which should be applied to the set of electrodes in the orifice passage 10. The control and update of the V2 value parallels the control of V1 disclosed above. In accordance with the control provided by the FIG. 9 routine, the vibration transmission phase characteristics are continuously controlled between the traces C6 and C8.

It will be noted that while the phase control is being implemented that the dynamic spring constant value tends to change between the traces C5 and C7. However, this change is relatively small.

With the instant embodiment during idling modes of operation both the dynamic spring constant and the vibration transmission phase are respectively continuously controlled between broad limits and thus ready attenuation of the sensed floor vibration is enabled. This of course, reduces the amount of vibration which is permitted to reach the vehicle passenger(s) and thus improves vehicle comfort.

What is claimed is:

1. A mount for supporting a power unit including an engine on a vehicle chassis comprising:
   an elastomeric body in which main and auxiliary chambers are defined; and
   first and second orifice passages for providing fluid communication between the main and auxiliary chambers, said first and second orifice passages respectively including first and second sets of electrodes upon which voltages can be selectively impressed by first and second individually controllable voltage sources, the first and second orifice passages, main and auxiliary chambers being filled with an electrorheological fluid which exhibits an increase in viscosity when exposed to a high voltage to selectively vary a dynamic spring constant and a vibration transmission phase of the mount for attenuating vibration transmitted from the power unit, said first and second orifice passages being arranged to cooperate with the main chamber in a manner wherein a frequency at which the mount exhibits a minimum value of the dynamic spring constant when neither of the first and second sets of electrodes have voltage impressed thereon and a frequency at which the mount exhibits a maximum value of the vibration transmission phase when one of the first and second sets of electrodes has a voltage impressed thereon, are the same as a frequency transmitted from the power unit while the engine is idling.

2. A mount as claimed in claim 1, wherein cross-sectional areas of the first and second orifice passages are selected so that the frequency at which the mount exhibits said minimum value of the dynamic spring constant and the frequency at which the mount exhibits said maximum value of the transmission phase are the same as the frequency transmitted from the power unit while the engine is idling.

3. In a vehicle:
a power unit including an internal combustion engine;
a parameter sensor which senses a parameter which varies with the rotational speed of the engine;
a mount which supports said power unit on a chassis of the vehicle, the mount including main and auxiliary electrorheological fluid filled chambers which are interconnected by first and second orifice passages, the first and second passages respectively including first and second sets of electrodes which are connected to first and second independently controllable sources of voltage;
a vibration sensor disposed on the vehicle chassis;
control means operatively connected with said parameter sensor, said vibration sensor and said first and second sources of voltage, said control means including circuitry for:
controlling the dynamic spring constant of the mount by:
selecting a first voltage based on the output of the parameter sensor,
inducing the first and second sources of voltage to apply the first voltage to said first and second sets of electrodes,
incrementing the first voltage in response to vibration which is sensed by the vibration sensor as decreasing, and
decrementing the first voltage in response to the vibration which is sensed by the vibration sensor as increasing by a first predetermined amount; and
alternately controlling the vibration transmission phase by:
selecting a second voltage based on the output of said parameter sensor;
inducing the first voltage source to impress a maximum voltage on the first set of electrodes;
inducing the second voltage source to impress the second voltage on the second set of electrodes,
incrementing the second voltage in response to the vibration which is sensed by said vibration sensor as decreasing, and
decrementing the second voltage in response to the vibration which is sensed by said vibration sensor as increasing by a second predetermined amount.

4. A suspension arrangement for a power unit including an engine comprising:
a plurality of mounts which support said power unit on a chassis of a vehicle, each mount including main and auxiliary chambers which are interconnected by first and second orifice passages, the first and second passages respectively including first and second sets of electrodes which are connected to first and second independently controllable sources of voltage, each mount being so constructed and arranged that said first and second orifice passages cooperate with the main chamber so that a frequency at which the mount exhibits a minimum value of the dynamic spring constant when neither of the first and second sets of electrodes have voltage impressed thereon and a frequency at which the mount exhibits a maximum value of the vibration transmission phase when one of the first and second sets of electrodes has a voltage impressed thereon are the same as a frequency transmitted from the power unit while the engine is idling;
a vibration sensor disposed on the vehicle chassis proximate a passenger compartment;
control means operatively connected with said vibration sensor and said first and second sources of voltage, said control means including circuitry for determining that the engine is idling and for cyclically controlling the dynamic spring constant and the vibration transmission phase of each of the mounts while the engine is idling:
the dynamic spring constant of each of the mounts being controlled by:
inducing the first and second sources of voltage to impress a first voltage on said first and second sets of electrodes,
incrementing the first voltage in response to vibration which is sensed by the vibration sensor as decreasing, and
decrementing the first voltage in response to the vibration which is sensed by the vibration sensor as increasing by a first predetermined amount; and
the vibration transmission phase of each of the mounts being controlled by:
inducing the first voltage source to impress a maximum voltage on the first set of electrodes; inducing the second voltage source to impress a second voltage on the second set of electrodes, incrementing the second voltage in response to the vibration which is sensed by said vibration sensor as decreasing, and
decrementing the second voltage in response to the vibration which is sensed by said vibration sensor as increasing by a second predetermined amount.

* * * * *